(12) United States Patent
Doerband et al.

(10) Patent No.: US 7,791,737 B2
(45) Date of Patent: Sep. 7, 2010

(54) METHOD AND APPARATUS FOR INTERFEROMETRICALLY MEASURING THE SHAPE OF A TEST OBJECT

(75) Inventors: Bernd Doerband, Aalen (DE); Matthias Dreher, Ulm (DE)

(73) Assignee: Carl Zeiss SMT AG, Oberkochen (DE)

( * ) Notice: Subject to any disclaimer, the term of this patent is extended or adjusted under 35 U.S.C. 154(b) by 267 days.

(21) Appl. No.: 11/939,382

(22) Filed: Nov. 13, 2007

(65) Prior Publication Data

US 2009/0237672 A1 Sep. 24, 2009

(30) Foreign Application Priority Data

Nov. 22, 2006 (DE) ........................ 10 2006 055 070

(51) Int. Cl.
*G01B 11/02* (2006.01)
*G01B 9/02* (2006.01)
(52) U.S. Cl. ...................................... 356/512; 356/521
(58) Field of Classification Search .................. 356/499, 356/511–514, 521
See application file for complete search history.

(56) References Cited

U.S. PATENT DOCUMENTS

| 5,526,116 | A | * | 6/1996 | de Groot ...................... 356/512 |
| 5,737,079 | A | | 4/1998 | Burge et al. |
| 6,344,898 | B1 | * | 2/2002 | Gemma et al. ............... 356/513 |
| 7,061,626 | B1 | * | 6/2006 | Schillke et al. .............. 356/513 |
| 2004/0174531 | A1 | | 9/2004 | Freimann |

FOREIGN PATENT DOCUMENTS

| DE | 196 43 074 A1 | 11/1997 |
| DE | 198 20 785 A1 | 10/1999 |
| DE | 100 05 172 A1 | 8/2001 |
| DE | 102 23 581 A1 | 12/2003 |
| DE | 102 58 248 A1 | 7/2004 |

OTHER PUBLICATIONS

Sommargren et al., "100-picometer interferometry for EUVL," Proceedings of the SPIE 2002, vol. 4688, pt 1-2, pp. 316-328.
Sommargren, G.E., "Phase shifting diffraction interferometry for measuring extreme ultraviolet optics," OSA Trends in Optics and Photonics, vol. 4, 1996, pp. 108-112, ix +235pp.
Voznesensky et al., "Principles of highest-precision optical parts estimation on the basis of a point-diffraction interferometer," Proceedings of the SPIE, Feb. 26, 2004, vol. 5252, No. 1, pp. 241-251.

* cited by examiner

*Primary Examiner*—Michael A Lyons
(74) *Attorney, Agent, or Firm*—Sughrue Mion, PLLC

(57) ABSTRACT

Electromagnetic illumination radiation is produced and provided as an input wave. The input wave passes through a diffractive optical element and leaves as an incoming measuring wave, the wave front of the input wave being transformed such that the wave front of the incoming measuring wave is adapted to the desired shape of the effective reflection surface. Furthermore, the test object is disposed in a test position in which the incoming measuring wave is reflected back to the diffractive optical element as a reflected measuring wave, the reflected measuring wave passing through the diffractive optical element and leaving as an outgoing measuring wave, the propagation direction of the outgoing measuring wave being deviated in relation to the opposite propagation direction of the input wave. A reference wave branched off from the illumination radiation interferes with the outgoing measuring wave this interference being recorded by detector.

24 Claims, 8 Drawing Sheets

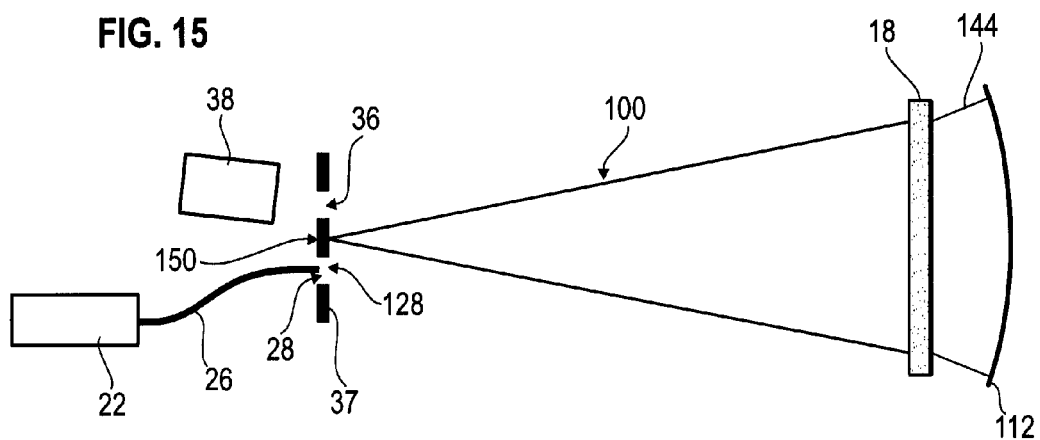
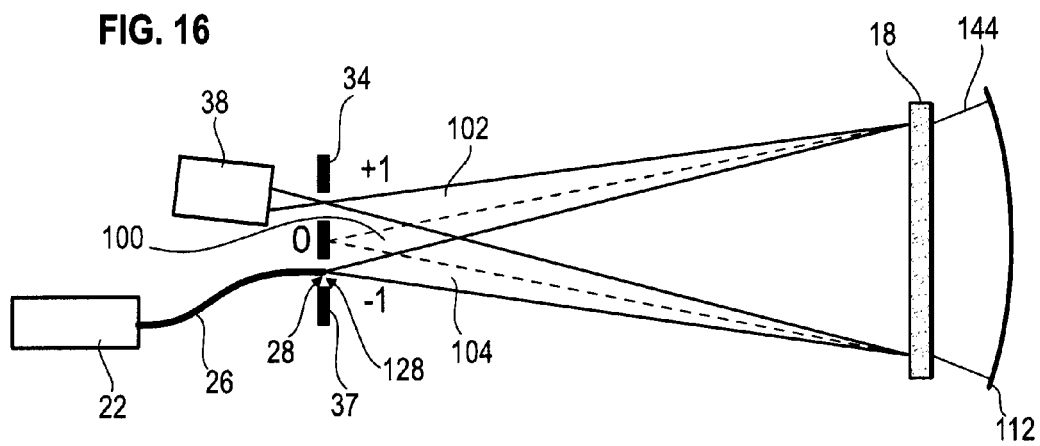

METHOD AND APPARATUS FOR
INTERFEROMETRICALLY MEASURING
THE SHAPE OF A TEST OBJECT

BACKGROUND TO THE INVENTION

The invention relates to a method and to an apparatus for interferometrically determining a deviation of an actual shape of an effective reflection surface of a test object from a desired shape of the effective reflection surface. Furthermore, the invention relates to a diffractive optical element for this type of apparatus.

With interferometric systems for measuring a surface of an aspherical optical element known from the prior art, a plane wave produced by a laser is split into a reference beam and a measuring beam. The measuring beam is thereupon converted by means of a focussing lens and a CGH (computer-generated hologram) into a wave which corresponds to the desired shape of the surface to be tested. The wave is thereupon reflected by the surface to be measured. The wave front of the reflected wave contains the deviations of the measured surface from the desired shape. The reflected wave is guided back in the optical path of the incoming measuring beam through the CGH and the focussing lens. The plane wave thus produced is finally reflected away from the optical path of the input wave by means of a reflecting element and overlaid with the reference beam. An interference pattern is thus produced which is focussed onto a recording plane of a camera by means of a focussing lens. Deviations of the shape of the measured surface from a desired shape of the surface are determined from the recorded interference pattern.

However, the previously known interferometric systems themselves cause substantial deviations or errors in the wave fronts of the waves passing through them. In order to determine the deviation of the shape of the test object from the desired shape from the recorded interference pattern with a high level of precision, extensive calibration steps are therefore taken with the interferometric arrangements from the prior art. Here, wave fronts are measured and evaluated in a plurality of rotational positions of the test object. With the aid of this type of calibration measures interferometer errors can be calculated out of the measurement results. However, the test object must have a rotationally symmetrical surface for this purpose. This means that highly precise measurement of the surface is only possible for test objects with rotationally symmetrical surfaces with the aforementioned interferometric systems.

SUMMARY OF THE INVENTION

It is an object of the invention to provide a method and an apparatus of the aforementioned type by means of which the aforementioned problems can be overcome, and in particular the shape of an effective reflection surface in any form, such as the surface of a test object, can be measured with a high level of precision.

The object is achieved according to the invention with a method of the type specified at the start with which by means of an illumination device electromagnetic illumination radiation is produced and provided as an input wave, the input wave passes through a diffractive optical element and leaves it as an incoming measuring wave the wave front of which is adapted to the desired shape of the effective reflection surface. Furthermore, the test object is disposed in a test position in which the incoming measuring wave is reflected back to the diffractive optical element by the effective reflection surface of the test object as a reflected measuring wave. Furthermore, the reflected measuring wave passes through the diffractive optical element and leaves the latter as an outgoing measuring wave, the propagation direction of the outgoing measuring wave being deviated upon passing out of the diffractive optical element in relation to the opposite propagation direction of the input wave upon passing into the diffractive optical element. Furthermore, a reference wave is branched off from the illumination radiation such that the reference wave interferes with the outgoing measuring wave, and an intensity distribution of an interference pattern produced by the interference of the reference wave with the outgoing measuring wave is recorded by means of a recording device. When the diffractive optical element is passed through, according to the invention the diffractive optical element can be passed through by the corresponding wave in transmission, but also be reflected on the diffractive optical element.

Moreover, the aforementioned object is achieved according to the invention with an apparatus of the type specified at the start which is set up in particular to implement the method according to the invention. The apparatus according to the invention has an illumination device which is set up to produce electromagnetic illumination radiation and to provide the latter as an input wave. Moreover, the apparatus comprises a diffractive optical element which is disposed in the optical path of the input wave and is set up to guide the input wave and to provide it as an incoming measuring wave the wave front of which is adapted to the desired shape of the effective reflection surface, and the diffractive optical element is furthermore set up to guide the incoming measuring wave onto the effective reflection surface of the test object disposed in a test position so that the latter is reflected back to the diffractive optical element by the effective reflection surface as a reflected measuring wave, and the diffractive optical element is further set up to guide the reflected measuring wave and to provide it as an outgoing measuring wave. Furthermore, the apparatus according to the invention comprises a branch element which is set up to branch off a reference wave from the illumination radiation such that the reference wave interferes with the outgoing measuring wave, and a recording device which is set up in order to record an intensity distribution of an interference pattern produced by interference of the reference wave with the outgoing measuring wave. According to the invention the propagation direction of the outgoing measuring wave is deviated upon passing out of the diffractive optical element in relation to the opposite propagation direction of the input wave upon passing into the diffractive optical element.

In other words, according to the invention an illumination device produces electromagnetic illumination radiation which is advantageously within the visible wavelength range. The illumination radiation is advantageously coherent, i.e. with regard to its temporal and spatial extension it advantageously has a fixed phase correlation such that it is suitable for producing interference occurrences. The illumination radiation is provided as an input wave by the illumination device. The input wave hits a diffractive optical element which is set up to convert either the input wave in its entirety, or a part thereof, into an incoming measuring wave. The conversion happens such that the incoming measuring wave produced has a wave front which is adapted to the desired shape of the effective reflection surface of the test object.

The effective reflection surface of the test object can be aspherical in form here and basically be of any free-form surface design. Therefore, the shape of the effective reflection surface does not have to be rotationally symmetrical. The diffractive optical element is therefore designed such that the wave front of the input wave is re-shaped into a wave front corresponding to the desired shape of the effective reflection surface of the test object. The test object is disposed in a test position in which the incoming measuring wave is reflected back to the diffractive optical element by the effective reflection surface of the test object. The test object can be, for example, an optical element such as, for example, a lens, and the effective reflection surface can be a surface of the test object. Therefore, the effective reflection surface can be a directly reflecting surface. However, it can also be, for example, an "optical component in the double passage".

The wave front of the measuring wave reflected back is modified in relation to the wave front of the incoming measuring wave by deviations of the actual shape of the effective reflection surface of the test object from its desired shape. The wave front of the measuring wave reflected back therefore contains information about the deviation of the actual shape of the effective reflection surface of the test object from its desired shape. The reflected measuring wave passes through the diffractive optical element again and leaves the latter as an outgoing measuring wave. The reflected measuring wave can pass here through the diffractive optical element in the zeroth order and therefore remain unchanged upon passing through the latter. In this case the outgoing measuring wave corresponds to the reflected measuring wave. In particular however, the reflected measuring wave can also be transformed by the diffractive optical element as regards its wave front. In any event, as does the reflected measuring wave, the wave front of the outgoing measuring wave contains the information about the deviation of the actual shape of the effective reflection surface from the desired shape. The shape of the wave front of the outgoing measuring wave advantageously corresponds to the wave front of the input wave which is modified by the deviations of the effective reflection surface of the test object from its desired shape.

According to the invention, the propagation direction of the outgoing measuring wave is deviated when the latter passes out of the diffractive optical element in relation to the opposite propagation direction of the input wave when the latter passes into the diffractive optical element. Therefore, the optical paths of the outgoing measuring wave and the input wave do not correspond. Furthermore, according to the invention a recording device is provided with which the intensity distribution of an interference pattern produced by the reference wave and the outgoing measuring wave can be recorded. The deviation of the actual shape of the effective reflection surface of the test object from the desired shape can then be determined with a high level of precision from the recorded intensity distribution.

The invention makes it possible to reduce the number of optical elements in the optical paths of the interferometric apparatus. Advantageously, the interferometric apparatus is in the form of a lens-free interferometer, i.e. the apparatus has no refractive or reflective lens elements. The only optical element of the apparatus is the diffractive optical element. Since the propagation direction of the outgoing measuring wave is deviated upon passing out of the diffractive optical element in relation to the opposite propagation direction of the input wave upon passing into the diffractive optical element, the outgoing measuring wave does not hit the outlet point of the input wave from the illumination device. Therefore, the outgoing measuring wave does not have to be deflected by means of a further optical element onto the recording device. Rather, the recording device can be positioned such that the interference pattern formed by the non-deflected outgoing measuring wave and the reference wave can be recorded without disturbing the input wave of the recording device. Due to the deviation of the propagation directions of the outgoing wave and the input wave, the illumination device and the recording device can be arranged such that the illumination device does not disturb the outgoing measuring wave nor does the recording device disturb the input wave.

Therefore, by means of the invention one can dispense with an optical element in the optical path of the outgoing measuring wave. Consequently, the effects of the interferometric apparatus upon the wave front of the outgoing measuring wave can be reduced. By reducing optical elements in the optical path of the interferometric apparatus, the number of unknown optical parameters, such as for example radii, thicknesses, refractive indices, surface deviations, inhomogeneities, distances and adjustment states etc. is minimised. Furthermore, high-frequency noise portions are suppressed or may not even arise.

Due to the reduction in interferometer errors by means of the invention, the deviation of the actual shape of the effective reflection surface of the test object from the desired shape can be determined with a higher level of precision. Due to this higher level of measuring precision, one can dispense with calibration of the interferometric apparatus by rotating the test object and multiple measurement of the latter. The requirement to provide the test object with a rotationally symmetrical surface is therefore eliminated. In fact, test objects with free-form surfaces of any shape can be measured.

In an embodiment according to the invention, upon passing through the optical element, the wave front of the input wave is transformed such that the wave front of the incoming measuring wave is adapted to the desired shape of the effective reflection surface. In a further embodiment according to the invention the wave front of the reflected measuring wave is transformed upon passing through the diffractive optical element. The input wave can therefore also pass through the diffractive optical element unaffected with regard to its wave front, for example upon passing through the zeroth order of the diffractive element. This can be advantageous if the wave front of the input wave already corresponds to the desired shape of the effective reflection surface. In this case, according to the present embodiment, the wave front of the reflected measuring wave is in any case transformed upon passing through the diffractive optical element. In a further embodiment both the wave front of the input wave is transformed upon passing through the optical element, and the wave front of the reflected measuring wave when the latter passes through the diffractive optical element.

Furthermore, it is advantageous if the apparatus according to the invention has an evaluation device which is set up to determine from the recorded intensity distribution a deviation of the actual shape of the effective reflection surface from the desired shape. The evaluation device determines deviations here in the structure of the measured interference pattern from a desired structure of the interference pattern which would be expected in the case where the effective reflection surface of the test object corresponds exactly to the desired shape. From the determined deviations the deviation of the actual shape of the effective reflection surface of the test object from its desired shape is thereupon determined, locally resolved, by means of the reflection surface. In one embodiment of the method according to the invention a deviation of the actual shape of the effective reflection surface from the desired shape is determined from the recorded intensity distribution.

Furthermore, it is advantageous if the centre point of the outgoing measuring wave lies within the aperture opening. In this case one can dispense with a focussing lens for recording the interference pattern. However, in this case the image of the interferogram recorded by means of the CCD detector may be somewhat blurred. In one advantageous embodiment the evaluation device is set up to first of all process the recorded intensity distribution of the interference pattern by means of numerical interpolation when determining the deviation of the actual shape of the effective reflection surface from the desired shape. Advantageously here, the image of the interferogram is "calculated into sharp state" with the aid of propagation techniques. For this purpose the phase distribution at the location of the detector is measured with the conventional stripe evaluation techniques, as is also in addition the amplitude distribution. With the aid of Fourier transformation, multiplication with a suitable quadratic phase term and Fourier re-transformation, the complex wave function can be propagated into a plane which corresponds to a central plane through the effective reflection surface of the test object. From this the phase distribution and the amplitude distribution can be calculated. Markings for determining the image geometry then appear sharply—the wave front which contains the shape deviation of the free-form surface is then highly resolved. In one embodiment of the method according to the invention the recorded intensity distribution of the interferogram is first of all processed by means of numerical interpolation when determining the deviation of the actual shape of the effective reflection surface from the desired shape.

Furthermore, it is advantageous if the test object has an at least partially reflecting surface and the effective reflection surface of the test object is the reflecting surface. This type of surface can for example be a surface of an optical element, such as for example a lens or a curved mirror. Therefore, by means of the method according to the invention a deviation of the surface of the test object from a desired shape of this surface can be determined.

In a further advantageous embodiment, the test object comprises transmission optics, such as a lens for example, and a reflecting element. The incoming measuring wave passes through the transmission optics upon reflection on the effective reflection surface and is reflected on the reflecting element. The effective reflection surface is a virtual reflection surface here which simulates the effect of the test object upon the incoming measuring wave. Therefore, the effective reflection surface is the reflection surface of a virtual mirror. The reflection surface of the virtual mirror is shaped such that the wave front of the incoming measuring wave undergoes the same change upon reflection on the virtual mirror as the wave front of the incoming measuring wave upon passing through the transmission optics and reflection on the mirror and, if applicable, upon repeatedly passing through the transmission optics. This type of measurement of transmission optics is also referred to as measuring a lens in "passage".

In a further embodiment according to the invention, a deviation of an actual optical path length through the transmission optics from a desired value for the optical path length is determined from the determined deviation of the actual shape of the effective reflection surface from the desired shape. In particular, a deviation of the distribution of the optical path length in a plane at right angles to the optical axis of the transmission optics from a desired distribution is determined.

In an advantageous embodiment according to the invention the input wave of the illumination device is provided with a spherical surface-type wave front. Therefore, the input wave is substantially a spherical wave, advantageously an ideal spherical wave. Furthermore, it is advantageous if the input wave is provided by the illumination device as an expanding spherical wave. One can therefore dispense with a focusing lens upstream of the diffractive optical element. The re-shaping of the input wave into the measuring wave adapted to the wave front of the desired shape of the effective reflection surface can be implemented totally by the diffractive optical element in the apparatus according to the invention. Therefore, effects of the interferometric apparatus upon the wave front of the outgoing measuring wave can be further reduced.

Furthermore, it is advantageous if both the outgoing measuring wave and the reference wave respectively have a spherical surface-type wave front and the centre point of the wave front of the reference wave lies in the region of the centre point of the wave front of the outgoing measuring wave. Here, the wave front of the outgoing measuring wave has the shape of a spherical surface with corresponding wave front deviations reflecting the deviations of the effective reflection surface of the test object from the desired shape. Therefore, the wave front of the outgoing measuring wave has at least approximately a centre point. Advantageously, the outgoing measuring wave is a converging spherical wave which converges towards this centre point. The wave front of the reference wave also has a spherical surface and therefore has at least approximately a centre point. The centre points of the reference wave and of the outgoing measuring wave are disposed close to one another here such that the deviation of the actual shape from the desired shape of the effective reflection surface can be determined with a high level of precision from an interference pattern produced from the reference wave and the outgoing measuring wave. Advantageously, the centre points of the reference wave and of the outgoing measuring wave coincide. Therefore, one can dispense with additional optical elements for coordinating the two waves.

In one advantageous embodiment the recording device comprises an aperture, in particular a pinhole aperture, with an aperture opening, and the aperture is positioned such that the centre point of the wave front of the outgoing measuring wave lies within the aperture opening. Therefore the centre point lies in the aperture plane. Therefore, for recording with the recording device the measuring wave does not have to be specifically focussed. One can therefore dispense with use of an ocular for focussing the outgoing measuring wave onto the recording device. The aperture allows the outgoing measuring wave to pass through, but blocks out higher diffraction orders and disturbing light. Advantageously, the recording device has a locally resolving surface detector, such as for example a CCD detector or a CCD camera. The latter is disposed a suitable distance away from the aperture. Furthermore, it is advantageous if the centre point of the reference wave also lies in the region of the aperture opening. The interference pattern produced by overlaying the reference wave with the outgoing measuring wave can therefore be recorded with the locally resolving surface detector without interposing a further optical element. Advantageously the optimal position of the locally resolving surface detector is determined before measuring a test object. For this purpose a calibration object, on the surface of which regular markings are provided, is positioned at the site of the test object. The locally resolving surface detector receives an image of the calibration object. In the latter the markings are identified and their position relative to the pixel raster determined. From this the image scale, distortion and coordinates of the calibration object on the sensor surface can be determined. From this information the optimal position of the locally resolving surface detector can be deduced.

Furthermore, it is advantageous if the input wave is provided by the illumination device such that the origin or the centre point of its spherical surface-type wave front is disposed in the plane of the aperture. In this case no further optical elements are required in the optical path of the input wave or of the measuring wave in order to focus the outgoing measuring wave produced in the apparatus into the aperture plane so that the centre point of the wave front of the outgoing measuring wave lies within the aperture opening. The measuring precision of the apparatus according to the invention is thus increased.

Furthermore, it is advantageous if the apparatus according to the invention is set up such that the input wave extends in a straight line between the illumination device and the diffractive optical element and/or the outgoing measuring wave extends in a straight line between the diffractive optical element and the recording device. In one embodiment of the method according to the invention the input wave extends in a straight line between the illumination device and the diffractive optical element and/or the outgoing measuring wave extends in a straight line between the diffractive optical element and the recording device. Therefore the waves are not deflected on their respective path. By means of this type of configuration of the interferometric apparatus the number of optical elements in the apparatus can be reduced. This increases the measuring precision of the apparatus and of the method.

Furthermore, it is advantageous if the propagation direction of the outgoing measuring wave and the opposite propagation direction of the input wave form an intermediate angle which is of dimensions such that the centre point of the wave front of the outgoing wave is spaced apart from a propagation axis of the input wave such that the interference pattern can be recorded by means of the recording device without disturbing the input wave. One can therefore dispense with an optical element in the optical path of the outgoing measuring wave. As already explained above, the measuring precision of the interferometric apparatus is therefore increased. Advantageously, the intermediate angle is of dimensions such that the centre point of the wave front of the outgoing measuring wave is spaced apart from the propagation axis of the input wave by at least 1 mm. In particular, the distance of the centre point of the wave front of the outgoing wave from the propagation axis of the input wave is at least as great as the diameter of the opening of a pinhole aperture used to record the outgoing measuring wave. In a further advantageous embodiment the centre point of the outgoing wave and the centre point of the input wave lie in a plane extending at right angles to the propagation direction of the input wave, and the centre points are spaced apart as specified above.

In order to ensure that neither the incoming wave of the recording device nor the outgoing measuring wave of the illumination device, and so the interference pattern, is disturbed, it is advantageous if the intermediate angle is at least 0.15°.

Furthermore, it is advantageous if the propagation direction of the incoming measuring wave leaving the diffractive optical element is deviated in relation to the propagation direction of the reflected input wave reaching the diffractive optical element. Therefore, the part of the input wave forming the measuring wave is deflected upon passing through the optical element. Advantageously the angle of deviation corresponds to half the intermediate angle between the propagation direction of the outgoing measuring wave and the opposite propagation direction of the input wave. Furthermore, it is advantageous if the propagation direction of the outgoing measuring wave leaving the diffractive optical element is deviated in relation to the propagation direction of the reflected measuring wave reaching the diffractive optical element. It is also advantageous here if the deviation angle corresponds to half the intermediate angle. The input wave can therefore be radiated e.g. at an angle in relation to the optical axis of the diffractive optical element, whereupon the incoming measuring wave produced by the diffractive optical element extends along the optical axis. The wave front of the incoming measuring wave is therefore aligned optimally to the effective reflection surface of the test object. Tilting of the wave front of the incoming measuring wave in relation to the effective reflection surface of the test object is therefore avoided. The measuring wave reflected by the test object is thereupon deflected once again in its propagation direction by the diffractive optical element so that the input wave and the outgoing measuring wave are deviated in relation to one another by the aforementioned intermediate angle.

In one advantageous embodiment the apparatus according to the invention is set up such that at least part of the input wave is converted into the measuring wave upon passing through the diffractive optical element, i.e. in transmission of the optical element, and such that the reflected measuring wave is also transformed into the outgoing measuring wave upon passing through the diffractive optical element. Furthermore, the optical path of the radiation of the input wave passing through the diffractive optical element differs from the optical path of the radiation of the reflected measuring wave in the diffractive optical element passing through the diffractive optical element. It is therefore possible for the optical path of the input wave to differ from the optical path of the outgoing measuring wave in the interferometric apparatus. This makes it possible in turn to record the interference pattern by means of the recording device without an additional deflection element in the optical path of the outgoing measuring wave.

Furthermore, it is advantageous if the diffractive optical element has a holographic optical element, in particular a computer-generated hologram (CGH). This type of holographic optical element enables particularly precise adaptation of the wave front of the measuring wave to the desired shape of the effective reflection surface of the test object. This applies in particular to aspherical surfaces, such as for example the surface of aspherical optical lenses.

Furthermore, it is advantageous if the reference wave is branched off from the input wave by means of the diffractive optical element. The branch element for branching off the reference wave from the illumination radiation is therefore advantageously integrated into the diffractive optical element. The branching off of the reference wave can therefore be implemented in this way with a particularly low level of effort.

Furthermore, it is advantageous if the diffractive optical element is set up to produce the incoming measuring wave from a part of the input wave passing through the diffractive optical element, and the reference wave from a part of the input wave reflected by the diffractive optical element. In one embodiment of the method according to the invention the incoming measuring wave results from a part of the input wave passing through the diffractive optical element, and the reference wave from a part of the input wave reflected by the optical element. Advantageously the diffractive optical element is in the form of a computer-generated hologram with a double structure or of a twice encoded computer-generated hologram.

Furthermore, it is advantageous if the illumination device comprises a radiation source for producing the illumination radiation and an optical wave guide attached to the latter, and the optical wave guide has an outlet surface from which the illumination radiation passes as the input wave with a spherical surface-type wave front. The radiation source can be designed, for example, as a laser. With an optical wave guide attached to the latter the illumination radiation can be guided to any location as the point of origin of the spherical input wave. Advantageously, the optical wave guide is designed as a monomode optical fibre the outlet surface of which serves as a "punctiform" radiation source. The use of the optical wave guide makes it possible to produce a spherical input wave without using lenses.

Furthermore, it is advantageous if the optical wave guide has an input section and two output sections, the input section is connected to the output sections by means of a branch, and the fibre optic cable is designed to branch off the radiation of the reference wave from the illumination radiation into one of the output sections by means of the branch, and to guide it to the location of the centre point of the wave front of the outgoing measuring wave by means of the output section. In this case the radiation of the reference wave is branched off from the illumination radiation before producing the spherical input wave by means of the branch of the optical wave guide, and thereupon provided as a spherical reference wave for interference with the outgoing measuring wave by means of an outlet surface of the corresponding output section. The location of the outlet surface defines the origin of the spherical reference wave, and so the centre point of its wave front. Since the reference wave passes out of the optical wave guide in the region of the centre point of the wave front of the outgoing measuring wave, it is made possible to produce a significant interference pattern between the reference wave and the outgoing measuring wave. Advantageously, a branching Y monomode fibre is used as an optical wave guide. The advantage of branching off the reference wave in the optical wave guide is that no further optical element needs to be positioned in the optical path in the input wave in order to branch off the reference wave. In order to avoid any possible influences causing errors in the measurement due to climatic changes and air movements, it is advantageous if the interferometric apparatus is disposed in a vacuum.

Furthermore, it is advantageous if in addition to the diffractive optical element, a reflecting element, in particular a Fizeau lens, is disposed in the optical path of the input wave and which is set up to branch off the reference wave from the input wave by reflection. In one embodiment of the method according to the invention the reference wave is branched off from the input wave by reflection on a reflecting element disposed in the optical path of the input wave, in particular on a Fizeau lens. Therefore, the reference wave passes through the greatest part of the spatial region in the interferometric apparatus also passed through by the input wave and the outgoing measuring wave. In this case climatic changes, air movements, mechanical changes or vibrations do not lead to substantial errors in the measuring result. Advantageously, the reflecting element is positioned accurately on the diffractive element by means of suitable auxiliary structures.

Furthermore, it is advantageous if the diffractive optical element comprises a first diffractive adjustment structure for adjusting the relative position between the test object and the diffractive optical element. Therefore, precise adjustment of the test object relative to the diffractive optical element is possible in order to ensure that the wave front of the measuring beam is aligned very precisely to the effective reflection surface of the test object. This increases the measuring precision which can be achieved by means of the apparatus according to the invention.

Furthermore, it is advantageous if the first diffractive adjustment structure is set up to focus a first part beam of the input wave onto a focus point spaced apart from the diffractive optical element by a desired distance and to overlay the first part beam reflected back by the surface of the test object disposed in an approximation position with the reference wave in order to produce a first adjustment interference pattern. Furthermore, the recording device is advantageously set up to record the intensity distribution of the first adjustment interference pattern, the apparatus is set up to establish a deviation of the approximate position of the test object from the desired test position by means of the recorded intensity distribution and thereupon to correspondingly correct the position of the test object. The correction of the position of the test object can comprise both correction of the site, of the angular position or of the rotational position of the test object relative to the diffractive optical element. The first diffractive adjustment structure is preferably designed as a computer-generated hologram which produces a spherical wave the focus point of which lies within the desired distance on the surface of the test object. By evaluating the interference pattern produced by means of the first diffractive adjustment structure both the distance between the test object and the diffractive optical element and also the tilt position of the test object relative to the diffractive optical element can be adjusted by tilt axes disposed at right angles to the optical axis of the diffractive optical element. According to one embodiment of the method according to the invention, when disposing the test object in the test position the test object is first of all disposed in an approximation position, a first part beam of the input wave is focussed by means of the first diffractive adjustment structure onto a focus point spaced apart from the diffractive optical element by a desired distance, the first part beam is reflected by the effective reflection surface of the test object and overlaid with the reference wave in order to produce a first adjustment interference pattern, the intensity distribution of the first adjustment interference pattern is recorded by means of the recording device, a deviation of the approximation position of the test object from the desired test position is established by means of the recorded intensity distribution, and thereupon the position of the test object is correspondingly corrected.

Advantageously, the first diffractive adjustment structure is set up to overlay the reflected first part beam with the reference wave, the reflected first part beam passing through the first adjustment structure and in so doing being focussed onto the recording device. It is advantageous here if the first diffractive adjustment structure has two individual structures and the first part beam passes through a first individual structure on the way to the test object and the beam reflected on the test object passes through the second individual structure. This type of adjustment structure is called a two-window adjustment structure. Alternatively, the beam reflected on the test object can also pass through the same individual structure again, as the first beam has already done on the way to the test object. An adjustment structure of this type is called a single-window adjustment structure. In one embodiment according to the invention of the method according to the invention the reflected first part beam is overlaid with the reference wave, the reflected first part wave passing through the first diffractive adjustment structure, and in so doing being focussed onto the recording device.

Furthermore, it is advantageous if the diffractive optical element has several first diffractive adjustment structures disposed in different positions, and in particular three first diffractive adjustment structures. Therefore, it is possible to adjust the test object with regard to its position relative to the diffractive optical element in a plurality of degrees of freedom. Moreover, it is advantageous if the test object is provided with a reflecting recess and the first part beam is aligned to the recess by means of the first adjustment structure. Therefore, the adjustment of the test object relative to the diffractive optical element is even better possible. Preferably, the test object has at least two reflecting recesses and in the diffractive optical element at least two first adjustment structures are provided which produce spherical waves the focus points of which coincide with the curvature centre points of the respective recess (single-window adjustment structures) or fall into a desired position relatively close to the curvature centre points (two-window adjustment structures). The waves reflected back by one of the reflecting recesses respectively provide a measure for the decentration of the test object in the plane at right angles to the optical axis of the diffractive optical element. By means of two reflecting recesses on the test object and the corresponding first adjustment structures, the azimuth position of the test object in relation to the optical axis of the diffractive optical element can therefore also be determined. Therefore, by means of three first adjustment structures all degrees of freedom of the test object can be adjusted in relation to the diffractive optical element.

Furthermore, it is advantageous if the illumination device and the recording device are connected to one another by means of an in/outlet module which has an outlet region of the input wave from the illumination device and an inlet region for the outgoing measuring wave into the recording device, and the diffractive optical element comprises a second diffractive adjustment structure for adjusting the relative position between the diffractive optical element and the in/outlet module. Preferably, the adjustment module is designed as a plate and contains the aperture opening of the recording device and an outlet surface of the illumination device from which the input wave emanates.

Moreover, it is advantageous if the diffractive optical element is at first disposed in an approximation position relative to the in/outlet module, a second part beam of the input wave is reflected onto a reflecting region of the in/outlet module by means of the second diffractive adjustment structure, reflected back onto the second adjustment structure by the reflecting region of the in/outlet module, reflected from the latter onto the inlet region of the in/outlet module and overlaid with the reference wave in order to produce a second adjustment interference sample. Furthermore, the recording device is advantageously set up to record the intensity distribution of the second adjustment interference sample. By means of the recorded intensity distribution a deviation of the approximation position of the diffractive optical element can then be established from a measuring position, and thereupon the position of the diffractive optical element can be corrected correspondingly relative to the adjustment module. Preferably, the second part beam is overlaid with the reference wave, the second part beam being reflected back from the reflecting region of the adjustment module being reflected onto the inlet region of the adjustment module. Moreover, it is advantageous if the diffractive optical element has several second adjustment structures disposed in different positions, and in particular two second adjustment structures, and for each of the second adjustment structures a reflecting region is provided on the adjustment module. Furthermore, it is advantageous if at least two reflecting regions of the adjustment module are in the form of recesses. In order to adjust all six degrees of freedom of the adjustment module relative to the diffractive optical element, it is advantageous to provide at least two reflective regions in the form of spherical recesses and a reflecting level region on the adjustment module. Alternatively, three reflective spherical depressions can also be provided. The adjustment module can therefore be adjusted very precisely in relation to the diffractive optical element, by means of which the measuring precision of the method according to the invention and of the apparatus according to the invention is further improved.

In a further embodiment according to the invention the second diffractive adjustment structure has two individual structures and by means of a first individual structure the second part beam of the input wave is reflected onto the reflecting region of the in/outlet module, and by means of the second individual structure the second part beam reflected back by the reflecting region of the in/outlet module is reflected onto the inlet region of the in/outlet module. In a further embodiment according to the invention the diffractive optical element has several second diffractive adjustment structures disposed in different positions, in particular three second diffractive adjustment structures, and for each of the second diffractive adjustment structures a reflecting region is provided on the in/outlet module. In a further embodiment according to the invention at least two reflecting regions of the in/outlet module are in the form of recesses.

In a further embodiment according to the invention the diffractive optical element has diffraction gratings which are arranged such that the latter form a super grating. By providing a super grating it is possible to bring about a deviation between the propagation direction of the outgoing measuring wave upon passing out of the diffractive optical element in relation to the opposite propagation direction of the input wave upon passing into the diffractive optical element. For this function, by providing the super grating only single encoding of the diffractive optical element is required. If the reference wave is produced by means of further encoding of the diffractive optical element, dual encoding of the diffractive optical element is sufficient. With dual encoding regions, e.g. bands with different diffractive fine structures are disposed alternately next to one another. By providing the super grating the encoding number of the diffractive optical element can be limited, in particular to a maximum of dual encoding. Any reflexes occurring are thus kept small, and a high useable light yield is made possible with a comparably low proportion of diffused light. This in turn makes it possible to measure the reflection surface of a test object with any shape with improved precision.

In a further embodiment according to the invention the period of the super grating is configured such that the wave produced in a diffraction order of the super grating when the reflected measuring wave passes through the diffractive optical element has the optical path of the opposite input wave, and the wave produced in another diffraction order of the super grating when the reflected measuring wave passes through the diffractive optical element has the optical path of the outgoing measuring wave. For example, the wave produced in the minus first diffraction order of the super grating can have the optical path of the opposite input wave, and the wave produced in the plus first diffraction order of the super grating has the optical path of the outgoing measuring wave. In particular, the outgoing measuring wave is formed by this wave.

In a further embodiment according to the invention the diffraction gratings are configured such that upon passing through the diffractive optical element in the zeroth diffraction order of the super grating a wave is produced from the reflected measuring wave the propagation direction of which lies between the opposite propagation direction of the input wave and the propagation direction of the outgoing measuring wave. In a further embodiment the illumination device has an outlet region of the input wave out of the illumination device, in particular an input aperture, and the recording device has an inlet region for the outgoing measuring wave, in particular an outlet aperture, and the wave produced in the zeroth diffraction order of the super grating is focussed onto a point between the outlet region and the inlet region.

In a further embodiment according to the invention the period of the super grating is configured such that the waves produced when the reflected measuring wave passes through the diffractive optical element in the minus nth and plus nth diffraction order, in particular in the minus first and plus first diffraction order of the super grating have the opposite propagation direction of the input wave or the propagation direction of the outgoing measuring wave. Since the optical path can be reversed, beams of the input wave arrive at the test item substantially at right angles, i.e. the input wave is reshaped upon passing through the super grating and the dispersion grating into the incoming measuring wave the wave front of which is adapted to the desired shape of the effective reflection surface. Upon the second passage through the super grating the reflected measuring wave is focussed onto the inlet region of the recording device in the first order of the super grating. The outgoing measuring wave can therefore be formed by the wave produced in the first order of the super grating.

In a further embodiment according to the invention the configuration of the individual diffraction gratings and/or the configuration of the super grating are specifically designed such that focus errors of the waves produced in the minus nth and the plus nth diffraction order, in particular in the minus first and the plus first diffraction order of the super grating are compensated. The symmetry of the design allows so-called odd and even focus errors. These can be compensated by means of corrections to the diffraction gratings (also called useful gratings) and/or on the super grating. Overall, from a diffraction grating arrangement corrected in this way, a wave passing from a spot light source in the input aperture can be converted into an almost perfect measuring wave, and the measuring wave reflected by the test object can be perfectly focussed onto the output aperture. In an alternative embodiment focus errors are deducted. It is possible to calculate the errors produced due to the higher diffraction order of the super grating in the intensity and the phase of the outgoing measuring wave in advance and to compensate for them in the measurement. Alternatively, the reference wave can also be adapted. Here e.g. diffraction structures which produce the reference wave can be adapted so that the reference wave has the same error as the outgoing measuring wave. The interference as a comparison of the reference wave and the outgoing measuring wave on the camera then no longer shows the error.

In a further embodiment according to the invention the diffraction gratings have diffraction structures of a first type and the diffractive optical element furthermore has diffraction structures of a second type which are configured to branch off the reference wave from the input wave by part of the input wave being reflected by means of the diffraction structures of the second type.

In a further embodiment according to the invention the super grating is formed by an alternating arrangement of regions with the diffraction structures of the first type and regions with the diffraction structures of the second type. The regions can for example be in the form of stripes which are aligned laterally to the connection between the outlet region of the input wave and the inlet region for the outgoing measuring wave. In one embodiment according to the invention the super grating is in the form of an amplitude super grating.

In a further embodiment according to the invention the diffractive optical element has regions with modified diffraction structures of the first type which are modified such that a wave produced upon passing through the modified diffraction structure of the first type has a phase shifted by $\pi/2$ in relation to a wave produced upon passing through a non-modified diffraction structure of the first type. The regions with diffraction structures of the first type and the regions with modified diffraction structures of the first type are respectively disposed next to one another as collective regions of the first type, and the super grating is formed by alternately arranging the collective regions of the first type and regions with diffraction structures of the second type. In this case the super grating can be in the form of a combination of an amplitude grating and a phase grating.

Furthermore, the aforementioned object is achieved with a diffractive optical element for an apparatus for interferometrically determining a deviation of an actual shape of an effective reflection surface of a test object from a desired shape of the effective reflection surface, the diffractive optical element being configured to pass through an input wave and to provide it as an incoming measuring wave, the wave front of which is adapted to the desired shape of the effective reflection surface, to guide the incoming measuring wave to the effective reflection surface of the test object disposed in a test position so that the latter is reflected back to the diffractive optical element by the effective reflection surface as a reflected measuring wave, to pass through the reflected measuring wave and to provide it as an outgoing measuring wave, and the diffractive optical element has diffraction gratings which are arranged such that the latter form a super grating, the diffraction gratings being configured such that a wave is produced from the reflected measuring wave upon passing through the diffractive optical element in the zeroth diffraction order of the super grating, the propagation direction of which lies between the opposite propagation direction of the input wave and the propagation direction of the outgoing measuring wave.

By providing a super grating it is possible to bring about a deviation between the propagation direction of the outgoing measuring wave upon passing out of the diffractive optical element in relation to the opposite propagation direction of the input wave upon passing into the diffractive optical element. For this function, by providing the super grating only single encoding of the diffractive optical element is required. If the reference wave is produced by means of further encoding of the diffractive optical element, dual encoding of the diffractive optical element is sufficient. With dual encoding regions, e.g. bands, with different diffractive fine structures are arranged alternately next to one another. By providing the super grating the encoding number of the diffractive optical element can be limited, in particular to a maximum of dual encoding. Any reflexes occurring are thus kept small, and a high useful light yield is made possible with a comparably small proportion of diffused light. This in turn enables the measurement of a reflection surface of a test object of any shape with improved precision.

Further embodiments of the diffractive optical element according to the invention result from the embodiments of the method according to the invention or the apparatus according to the invention detailed above. The features given with regard to the diffractive optical element in connection with the method according to the invention or the apparatus according to the invention can of course also be transferred to the separately claimed diffractive optical element independently of the apparatus according to the invention.

The features specified with regard to the advantageous embodiments of the apparatus according to the invention detailed above can correspondingly be transferred to the method according to the invention and vice versa. The advantageous embodiments of the method according to the invention and the apparatus according to the invention resulting from this shall be specifically included by the disclosure of the invention.

BRIEF DESCRIPTION OF THE DRAWINGS

In the following exemplary embodiments of the apparatus according to the invention are described in greater detail by means of the attached diagrammatic drawings. These show as follows.

DETAILED DESCRIPTION OF ADVANTAGEOUS EXEMPLARY EMBODIMENTS

Figure 1:
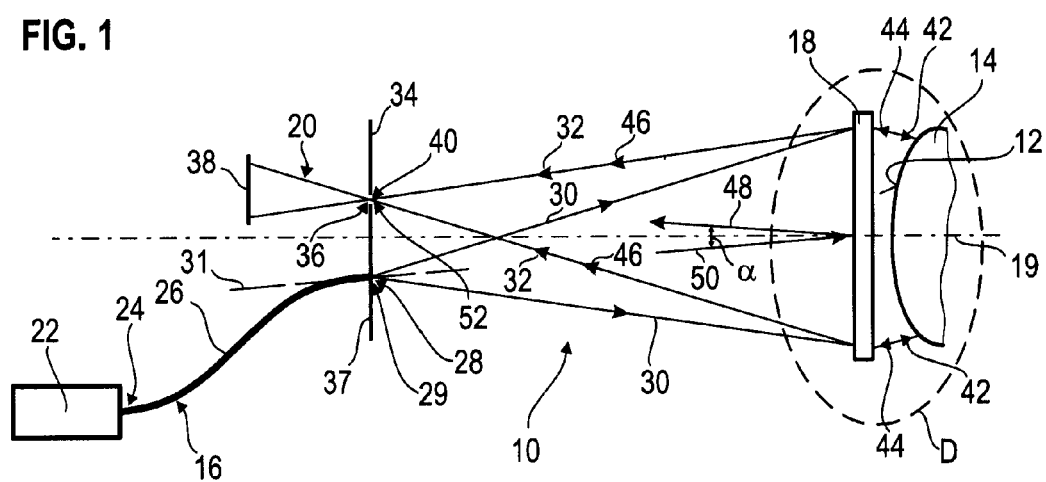
FIG. 1 a sectional view of a first exemplary embodiment of the apparatus according to the invention, FIG. 2 a sectional view of a second exemplary embodiment of the apparatus according to the invention, FIG. 3 a sectional view of a third exemplary embodiment of the apparatus according to the invention, FIG. 4 an illustration of detail D of the apparatuses according to FIGS. 1 to 3, FIG. 5 an illustration of a diffractive optical element used in the apparatuses according to FIGS. 1 to 3 with first adjustment structures for adjusting a test object, FIG. 6 a partial illustration of one of the apparatuses according to FIGS. 1 to 3 in a first embodiment serving to illustrate an adjustment of a diffractive optical element in relation to an in/outlet module, FIG. 7 a partial illustration of one of the apparatuses according to FIGS. 1 to 3 in a second embodiment serving to illustrate an adjustment of a diffractive optical element in relation to an in/outlet module, FIG. 8 a partial illustration of one of the apparatuses according to FIGS. 1 to 3 in a third embodiment serving to illustrate an adjustment of a diffractive optical element in relation to an in/outlet module, FIG. 9 a partial illustration of one of the apparatuses according to FIGS. 1 to 3 in a fourth embodiment serving to illustrate an adjustment of a diffractive optical element in relation to an in/outlet module, FIG. 10 a test object measurable by means of one of the apparatuses according to FIGS. 1 to 3 with transmission optics in the cat's eye position and a reflecting element, FIG. 11 the test object according to FIG. 10 with which the transmission optics are disposed in the autocollimation position, FIG. 12 a top view of a part-region of a first embodiment of a diffractive optical element according to the invention for the apparatus according to FIG. 1, FIG. 13 a top view of a part-region of a second embodiment of a diffractive optical element according to the invention for the apparatus according to FIG. 1, FIG. 14 a top view of a part-region of a third embodiment of a diffractive optical element according to the invention for the apparatus according to FIG. 1, FIG. 15 and FIG. 16 an illustration of the mode of operation of the diffractive optical element according to either of FIGS. 13 and 14 in the apparatus according to FIG. 1, FIG. 17 a first part-region of FIG. 16 for estimating by calculation the dimensions of a super grating period of the diffractive optical element, FIG. 18 a top view of the diffractive optical element in the embodiment according to FIG. 12, and FIG. 19 a top view of a diffractive optical element in a further embodiment.

In FIG. 1 a first exemplary embodiment of an apparatus 10 according to the invention in the form of a lens-free interferometer is shown. The apparatus 10 serves to implement a method according to the invention for interferometrically determining a deviation of an actual shape of an effective reflection surface in the form of a reflecting surface 12 of a test object 14 from a desired shape of the surface 12. The apparatus 10 comprises an illumination device 16, a diffractive optical element 18 in the form of a computer-generated hologram structure (CGH structure), a holding device, not shown in the drawing, for holding the test object, and a recording device 20. The diffractive optical element 18 extends at right angles to its optical axis 19.

The illumination device 16 comprises a radiation source 22 in the form of a laser. The radiation source 22 produces electromagnetic illumination radiation 24 in the form of visible coherent light. Preferably, the electromagnetic illumination radiation 24 is substantially monochromatic. Furthermore, the illumination device 16 comprises an optical wave guide 26 in the form of a monomode optical fibre. The optical wave guide 26 is attached to the radiation source 22 and guides the electromagnetic illumination radiation 24 to an outlet surface 28 of the optical wave guide 26. The outlet surface 28 serves as a "punctiform" light source. The electromagnetic illumination radiation 24 passes out of the outlet surface 28 as an input wave 30 with a spherical surface-shaped wave front and so as an expanding spherical wave the origin 29 of which lies on the outlet surface. The input wave 30 spreads along a propagation axis 31 here which is directed towards the diffractive optical element 18. Between the outlet surface 28 and the diffractive optical element 18 there is no optical element, such as a lens for example. Therefore, the input wave 30 extends in a straight line between the illumination device 16 and the diffractive optical element 18.

The diffractive optical element 18 has at least a double structure. By means of the double structure one part of the input wave 30 is reflected by the diffractive optical element 18 and another part is transmitted. The reflected part of the input wave 30 serves as a reference wave 32. The reference wave 32 also has a spherical surface-shaped wave front and converges towards the recording device 20. The recording device 20 comprises an aperture 34 in the form of a pinhole aperture with an aperture opening 36. The aperture 34 is part of an in/outlet module 37 in the form of a plate which includes the outlet surface 28 of the illumination device 16.

The recording device 20 further comprises a locally resolving two-dimensional detector in the form of a CCD detector 38. The reference wave 32 converges onto a centre point 40 of the reference wave 32. This is the centre point of the spherical surface-shaped wave front of the reference wave 32. The reference wave 32 is aligned such that its centre point 40 lies within the aperture opening 36. The part of the input wave 30 transmitted by the diffractive optical element 18 is converted into an incoming measuring wave 42 by the diffractive optical element 18. In so doing the spherical surface-shaped wave front of the input wave 30 is adapted to the desired shape of the surface 12 of the test object 14. The desired shape is a surface shape striven for the given test object 14 and is generally aspherical. The desired shape does not have to have any rotation properties and can therefore be designed as any free-form surface. The incoming measuring wave 42 is reflected on the surface 12 of the test object 14 and after its reflection is called a reflected measuring wave 44. The wave front of the reflected measuring wave 44 differs from the wave front of the incoming measuring wave 42 by the deviations of the surface 12 of the test object 14 from the desired shape. In certain cases the surface 12 can already have a shape corresponding to the shape of the input wave 30. In this case the optical element 18 can be configured such that the input wave 30 is not changed as regards its wave front upon passing through the optical element 18.

Thereupon, the reflected measuring wave 44 passes through the diffractive optical element 18 and is transformed by the latter into an outgoing measuring wave 46 with a spherical surface-type wave front. The wave front of the outgoing measuring wave 46 only deviates from the spherical surface shape by the deviations of the surface 12 of the test object from the desired shape. A propagation direction 48 of the outgoing measuring wave 46 is deviated in relation to a propagation direction 50 of the input wave 30 by an intermediate angle $\alpha$. The intermediate angle $\alpha$ is of dimensions such that a centre point 52 of the outgoing measuring wave 46 is spaced apart from the propagation axis 31 of the input wave 30 to such an extent that an interference pattern produced by overlaying the reference wave 32 with the outgoing measuring wave 46 can be recorded by means of the recording device 20 without disturbing the input wave 30. The intermediate angle $\alpha$ is preferably at least 0.15°.

The optical path of the outgoing measuring wave 46 corresponds to the optical path of the reference wave 32. Therefore, the centre point 52 of the outgoing measuring wave 46 corresponds to the centre point 40 of the reference wave 32 and also lies within the aperture opening 36. The intensity distribution of the interference pattern or interferogram produced by the overlaying of the reference wave 32 with the outgoing measuring wave 46 is recorded by means of the CCD detector 38. Thereupon, a deviation of the actual shape of the surface 12 from the desired shape is determined from the recorded intensity distribution by means of an evaluation device not shown in the drawing. For this purpose the recorded intensity distribution of the interferogram is first of all processed by means of numerical interpolation and so "calculated into sharp state".

Figure 4:
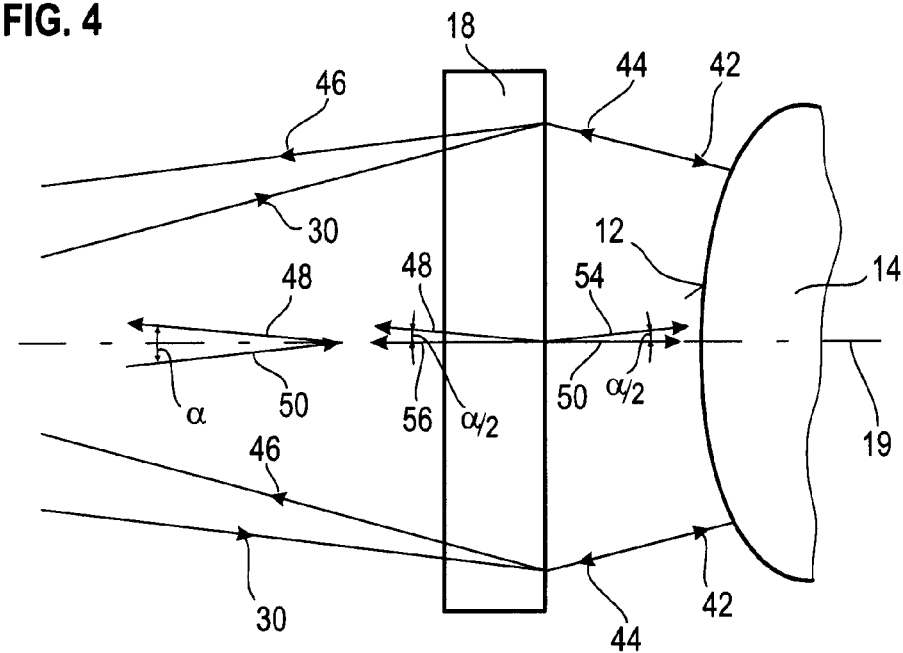

FIG. 4 shows a detail D of the apparatus 10 according to FIG. 1 in order to illustrate the course of the beams passing through the diffractive optical element 18. Therefore, in order to simplify the illustration, the reflected reference wave 32 is not shown. It can be seen from FIG. 4 that the propagation direction 50 of the input wave 30 is deviated in relation to the propagation direction 54 of the incoming measuring wave 42 by $\alpha/2$. Furthermore, the propagation direction 48 of the outgoing measuring wave 46 is also deviated by $\alpha/2$ in relation to the propagation direction 56 of the reflected measuring wave 44 reaching the diffractive optical element 18. Therefore, the diffractive optical element 18 is designed in order to deviate the waves passing through it by half the intermediate angle $\alpha/2$ respectively. This means, as described above, that the propagation direction 48 of the outgoing measuring wave 46 is deviated by the full intermediate angle $\alpha$ in relation to the propagation direction 50 of the input wave 30. As can also be seen in FIG. 4, it is a consequence of the deflecting property of the diffractive optical element 18 that the optical path of the radiation of the input wave 30 passing through the diffractive optical element 28 differs from the optical path of the radiation of the reflected measuring wave 44 passing through the diffractive optical element 28 in the diffractive optical element 18.

Figure 2:
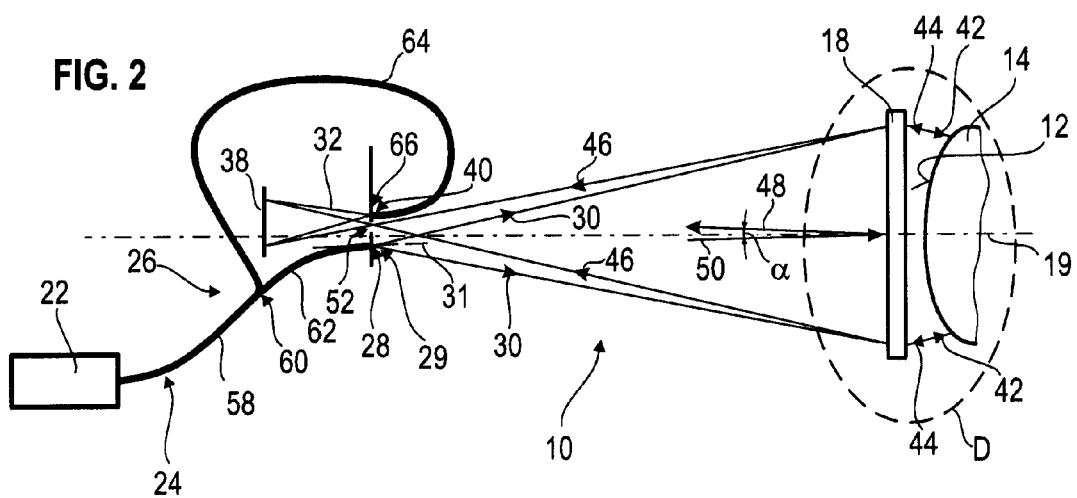

FIG. 2 shows a second exemplary embodiment of the apparatus according to the invention 10. This differs from the exemplary embodiment of the apparatus 10 shown in FIG. 1 in that the diffractive optical element 18 does not reflect the input wave 30. In fact, according to the embodiment according to FIG. 2, the optical wave guide 26 is designed as a branching y monomode fibre which has an input section 58 which branches by means of a branch 60 into a first output section 62 and a second output section 64. By means of the branch 60 part of the illumination radiation 24 produced by the radiation source 22 is branched off into the second output section 64, and on an outlet surface 66 of the second output section 64 radiated onto the CCD detector 38 as a spherical reference wave 32 with its origin, i.e. its centre point 40, directly adjacent to the aperture opening 36. The distance between the centre point 40 of the reference wave 32 and the centre point 52 of the outgoing measuring wave 46 is preferably in the region of a typical diameter of the aperture opening 36 of e.g. 2-3 mm. The first output section 62 guides the illumination radiation 24 to the outlet surface 28 on the in/outlet module 37.

Figure 3:
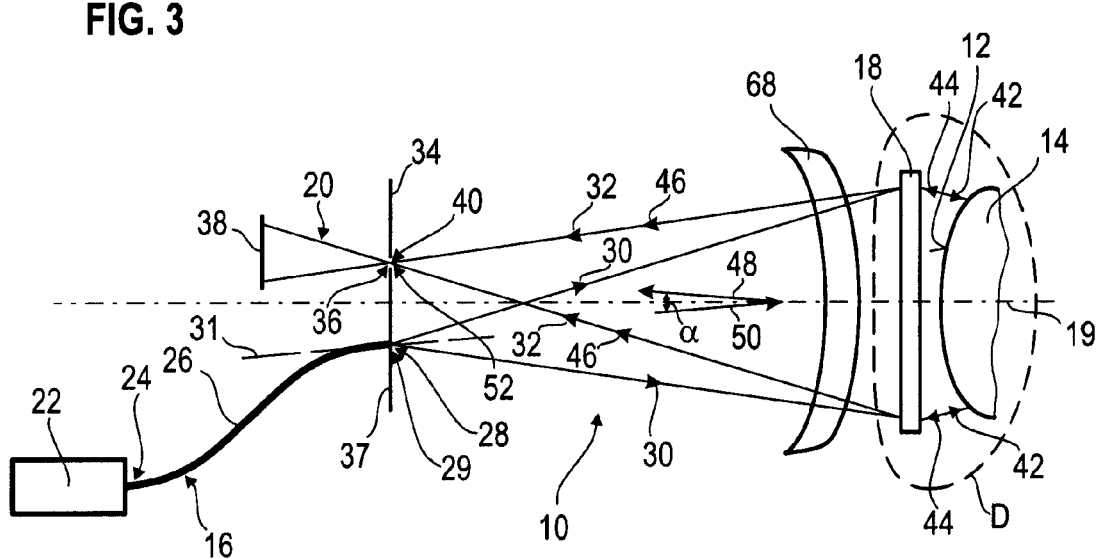

FIG. 3 shows a third exemplary embodiment of the apparatus 10 according to the invention. This embodiment differs from the embodiment shown in FIG. 2 in that the radiation for the reference wave 32 is not already branched off from the illumination radiation 24 in the optical wave guide 26, but a reflecting element 68 in the form of a Fizeau lens is provided for this purpose. The reflecting element 68 is disposed in the optical path of the input wave 30. Part of the radiation of the input wave 30 is reflected to the aperture 34 as a reference wave 32 by the reflecting element 68. This reference wave 32 is, as in the exemplary embodiment according to FIG. 1, a spherical wave the centre point 40 of which lies within the aperture opening 36. The detail D illustrated in FIG. 4 and described above is also contained in the apparatuses 10 according to FIGS. 2 and 3.

Figure 10:
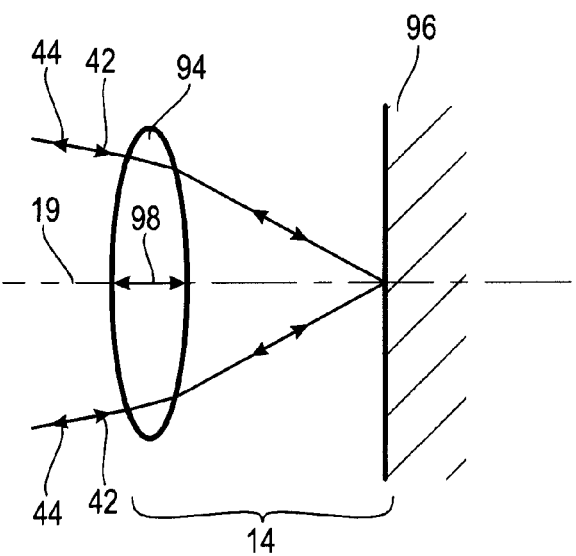
Figure 11:
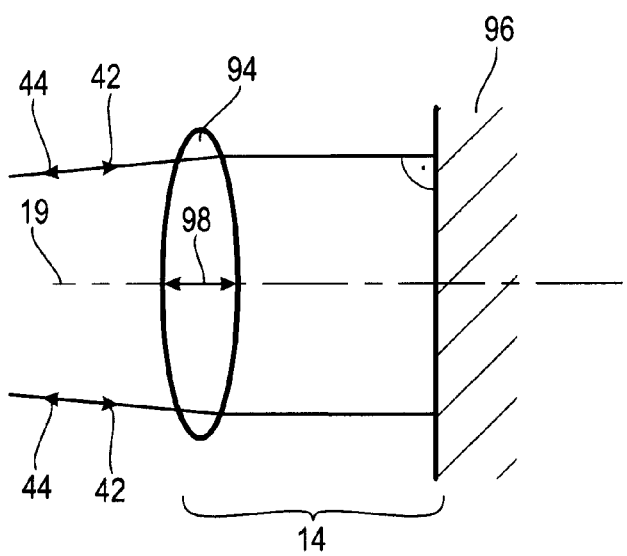

FIGS. 10 and 11 show an alternative embodiment of a test object 12 which can be measured by means of the apparatuses 10 according to the invention shown in FIGS. 1 to 3. This test object 12 comprises transmission optics 94 in the form of a lens and a reflecting element 96 in the form of a mirror disposed behind the transmission optics. In FIG. 10 the transmission optics 94 are disposed in the cat's eye position, and in FIG. 11 in the autocollimation position. Intermediate positions are also possible. When implementing the measuring method according to the invention the incoming measuring wave 42 first of all passes through the transmission optics 94, is thereupon reflected on the reflecting element 96 and passes through the transmission optics 94 once again in order to then pass to the diffractive optical element 18 as a reflected measuring wave 44. It is the aim to measure the transmission optics 94 as they pass through. In the result the deviation of an actual shape of an effective reflection surface of the test object 14 from a desired shape is measured, the effective reflection surface being a virtual reflection surface which simulates the effect of the test object 14 upon the incoming measuring wave 42. The effective reflection surface not drawn in FIGS. 10 and 11 is the reflection surface of a virtual mirror which is shaped such that the wave front of the incoming measuring wave 42 undergoes the same change upon passing through the transmission optics 94 and reflecting on the reflecting element 96 as the wave front of the incoming measuring wave 42 upon passing through the test object 14, i.e. passing through the transmission optics 94, reflection on the reflecting element 96 and passing through the transmission optics 94 once again. From the course of the effective reflection surface a deviation of the distribution of the optical path length 98 through the transmission optics 94 at right angles to the optical axis 19 from a desired distribution can be established.

Figure 5:
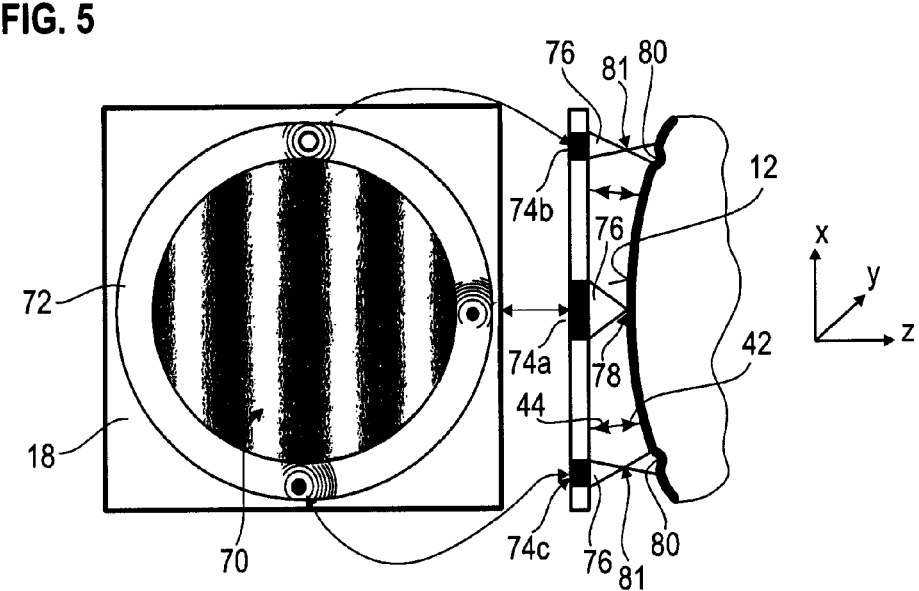

FIG. 5 shows an embodiment of a diffractive optical element 18 used in one of the exemplary embodiments of the apparatus 10 according to FIGS. 1 to 3. The diffractive optical element 18 comprises a diffractive main structure 70 for converting a transmitted part of the input wave 30 into the incoming measuring wave 42 and reflecting a further part of the input wave 30 as a reference wave 32. The diffractive optical element 18 according to FIG. 5 comprises a peripheral region 72 surrounding the diffractive main structure 70. This contains three first diffractive adjustment structures 74a, 74b and 74c. These serve to adjust the position of the test object 14 relative to the diffractive optical element 18. By adjusting the test object 14 the latter is first of all disposed in an approximation position.

In order to set a distance z between the test object 14 and the diffractive optical element 18 according to the coordinate system shown in FIG. 5, a first part beam 76 of the input wave 30 is focussed by means of the first adjustment structure 74a onto a focus point 78 spaced apart from the diffractive optical element 18 by a desired distance. The first part beam 76 is reflected by the surface 12 of the test object 14 and overlaid with the reference wave 32 in order to produce a first adjustment interference pattern. The resulting intensity distribution is recorded by means of the recording device 20 and thereupon a deviation of the approximation position of the test object 14 from the desired test position as regards the position of the test object 14 in the z direction is established, and thereupon the z position of the latter is correspondingly corrected. The tilt x and y is preferably controlled by the number of stripes on the surface 12 of the test object 14, and is readjusted if necessary. The function of the first diffractive adjustment structure 74a described above is also called the "cat's eye function".

The two further first diffractive adjustment structures 74b and 74c are used to adjust the test object 14 with regard to its decentration in the x and the y direction and its azimuth position with regard to the diffractive optical structure 18. On the edge of its surface 12 the test object 14 is provided with at least two reflecting spherical indentations and recesses 80 which serve as reference surfaces. The two further first diffractive adjustment structures 74b and 74c respectively produce spherical waves. The focus points 81 of the spherical waves coincide with the curvature centre points of the recesses 80 in the case where the first diffractive adjustment structures 74b and 74c are in the form of the single-window structures described below. With the so-called two-window structures also discussed below, the focus points of the spherical waves produced by means of the first adjustment structures 74b and 74c fall in a desired position relatively close to the curvature centre points of the spherical reflecting recesses 80. The correspondingly reflected waves pass through the corresponding first adjustment structures 74b and 74c and are thus guided through the aperture opening 36 onto the CCD detector 38 where they interfere with the reference wave 32. Each of the at least two first adjustment structures 74b and 74c provides a measure for the decentration of the surface 12 of the test object 14 both in the x and in the y direction. The azimuth position of the surface 12 can also be determined by means of at least two adjustment structures of this type. The adjustment structures 74b and 74c additionally offer the possibility of controlling the distance and the tilts if the spherical recesses 80 are produced with corresponding precision.

The first adjustment structures 74a, 74b and 74c can respectively be in the form either of so-called single-window structures or of two-window structures. The first diffractive adjustment structures 74a, 74b and 74c illustrated in FIG. 5 are respectively in the form of single-window adjustment structures. In this case the respective first part beam 76 branched off from the input wave 30 first of all passes through the respective first adjustment structure 74a, 74b or 74c, and after the reflection of the latter on the surface 12 of the test object 14 passes through the same point of the respective adjustment structure again. In the case of two-window adjustment structures, these respectively have two individual structures separated from one another, the first part beam 76 passing through a first individual structure on the way to the test object 14, and the part beam 76 reflected on the test object 14 then passing through a second individual structure.

Figure 6:
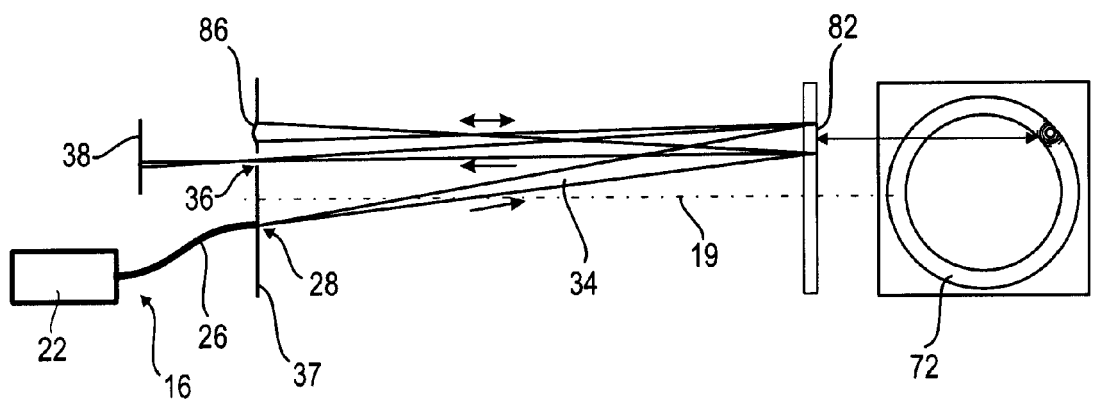
Figure 7:
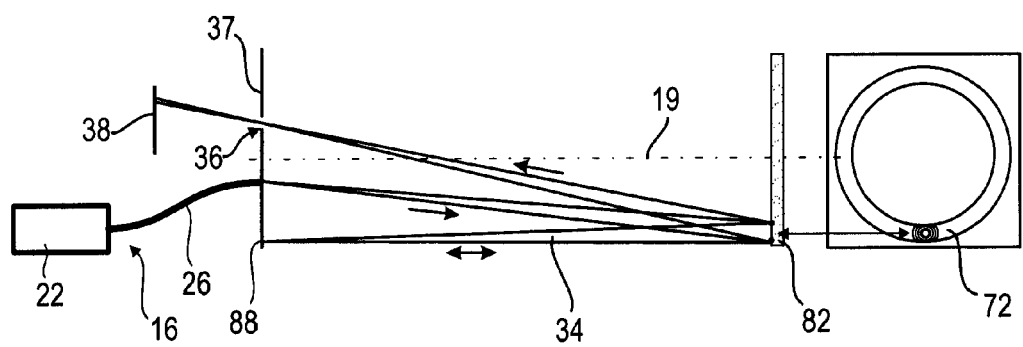
Figure 8:
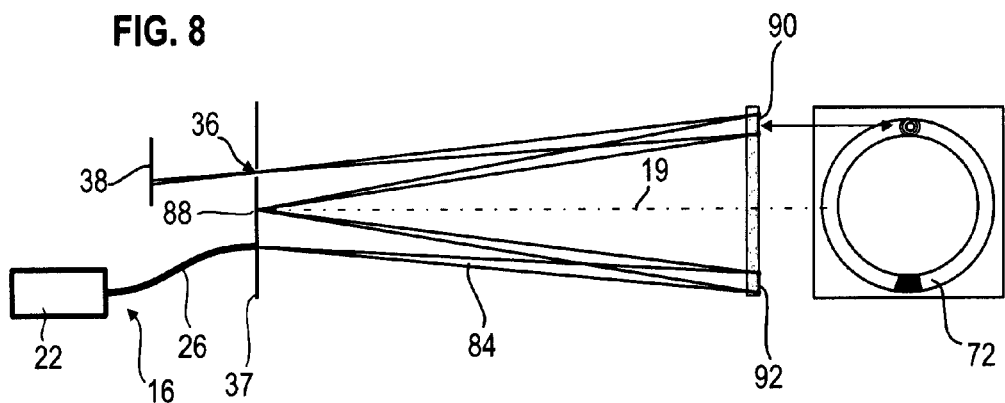
Figure 9:
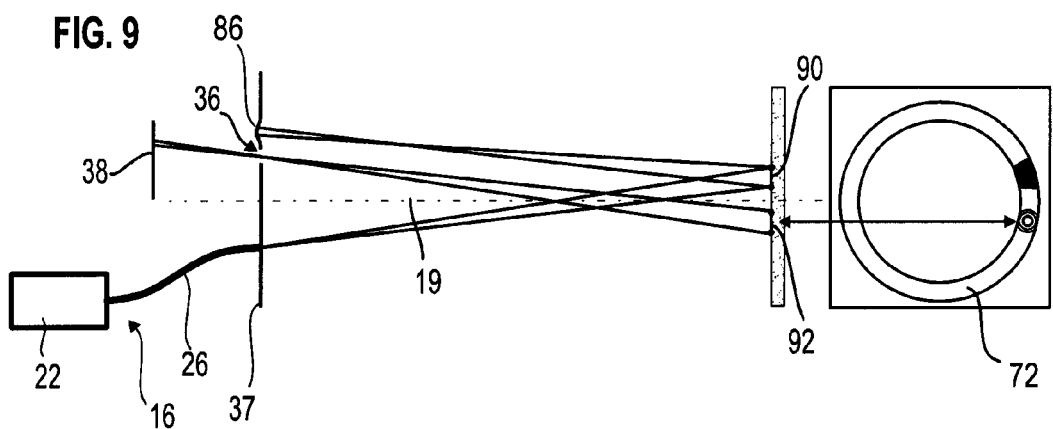

FIGS. 6 to 9 serve to illustrate the adjustment of the diffractive optical element 18 in relation to the in/outlet module 37 which comprises the outlet surface 28 of the optical wave guide 26 and the aperture opening 36 for the inwards passage of the outgoing measuring wave 46 into the recording device 20. For the adjustment of the diffractive optical element 18 in relation to the in/outlet module 37 the diffractive optical element 18 has at least one second diffractive adjustment structure 82. The diffractive optical element 18 is first of all disposed in an approximation position relative to the in/outlet module 37. A second test beam 84 of the input wave 30 is reflected by means of the second diffractive adjustment structure 82 onto a reflecting region of the in/outlet module 37. Here the reflecting region can be in the form of a reflecting spherical recess 86, as shown in FIGS. 6 and 9, or as a level reflecting region 88, as shown in FIGS. 7 and 8. The radiation is reflected back by the reflecting region 86 or 88 onto the second diffractive adjustment structure 82 from where it is reflected onto the aperture opening 36 and is overlaid with the reference wave 32 in order to produce a second adjustment interference pattern.

The intensity distribution of the second adjustment interference pattern is recorded by means of the recording device 20, and from this a deviation of the approximation position of the diffractive optical element 18 from a desired measuring position is established. After this, the relative position between the diffractive optical element 18 and the in/outlet module 37 is correspondingly corrected. In order to determine all six degrees of freedom of the in/outlet module 37 at least three second diffractive adjustment structures 82 disposed at different positions of the peripheral region 72 of the diffractive optical element 18 are required. Furthermore, two reflecting or mirrored spherical recesses 86 and a reflecting level region 88 are correspondingly to be provided on the in/outlet module 37. Alternatively, two reflecting spherical recesses 86 and three level reflecting regions 88 can also be used.

FIGS. 6 and 7 respectively show a second diffractive adjustment structure 82 in a single-window embodiment. As with the first diffractive adjustment structures 74a, 74b and 74c, the second diffractive adjustment structures 82 can also be in the form of two-window structures. A corresponding beam course of the second part beam 84 for this type of two-window embodiment is shown on the one hand in FIGS. 8 and 9 on the example of a level reflecting region 88 on the in/outlet module 37, and on the other hand on the example of a reflecting spherical recess 86 on the in/outlet module 37. In the two-window embodiment the second diffractive adjustment structure 82 has two individual structures, namely a first individual structure 90 and a second individual structure 92. The second part beam 84 is reflected by means of the first individual structure 90 onto the reflecting region 86 or 88 of the in/outlet module 37. The second part beam reflected back by the reflecting region 86 or 88 is reflected onto the aperture opening 36 by means of the second individual structure 92.

Figure 12:
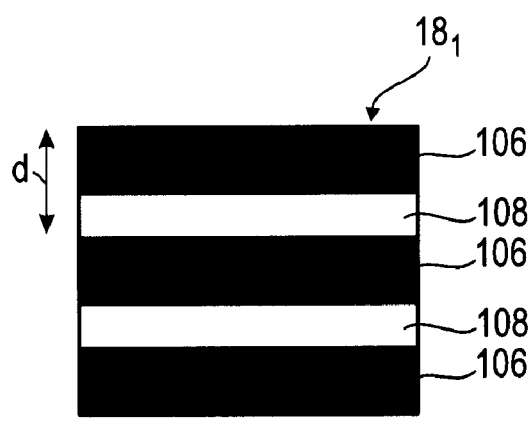
Figure 13:
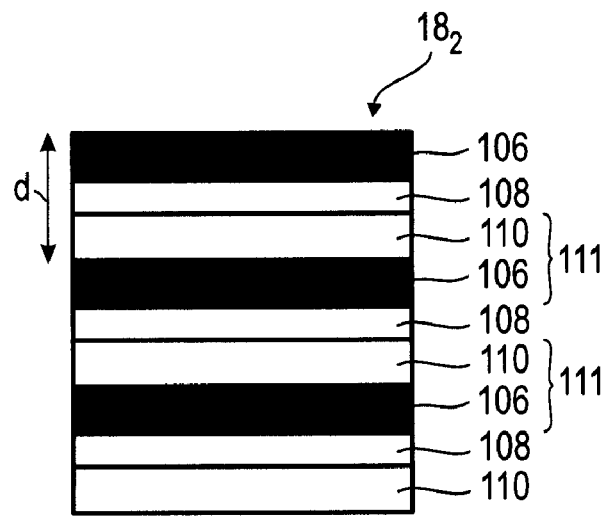
Figure 14:
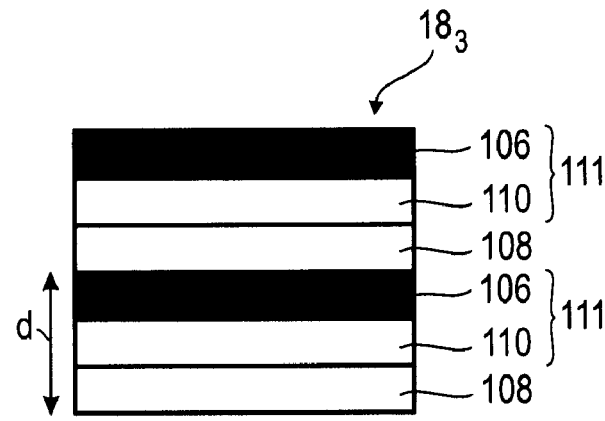

FIGS. 12 to 14 show respective sections of different embodiments $18_1$, $18_2$ and $18_3$ of the diffractive optical element 18 in the embodiment according to FIG. 1. The diffractive optical elements $18_1$, $18_2$ and $18_3$ are designed to branch off the reference wave 32 from the input wave 30 in reflection, as shown in FIG. 1. Furthermore, the diffractive optical elements $18_1$, $18_2$ and $18_3$ have the function of converting the input wave 30 in transmission into the incoming measuring wave 42 the wave front of which is adapted to the desired shape of the effective reflection surface in the form of the surface 12 of the test object 14. Moreover, the diffractive optical elements $18_1$, $18_2$ and $18_3$ are set up to convert the reflected measuring wave 44 in transmission into the outgoing measuring wave 46 the propagation direction of which is deviated upon passing out of the diffractive optical element $18_1$, $18_2$ or $18_3$ in relation to the opposite propagation direction of the input wave 30 upon passing into the diffractive optical element $18_1$, $18_2$ and $18_3$.

The diffractive optical elements $18_1$, $18_2$ and $18_3$ respectively have stripe-shaped regions 106 or sub-apertures with dispersion structures of a first type. These diffraction structures are in the form of diffraction gratings and are designed to reshape the input wave 30 into the incoming measuring wave 42 the wave front of which is adapted to the desired front of the effective reflection surface in the form of the surface 12. Furthermore, the diffractive optical elements $18_1$, $18_2$ and $18_3$ respectively have stripe-shaped regions 108 or sub-apertures with diffraction structures of a second type. The diffraction structures of the second type are designed to branch off the reference wave 32 from the input wave 30 in reflection.

The regions 106 are arranged such that the diffraction gratings of the latter form a super grating. The regions 108 the diffraction structures of which are designed to produce the reference wave 32 in reflection are "blind" for the reflected measuring wave 44, i.e. the regions 108 have the effect of a dark zone upon the reflected measuring wave 42. In the diffractive optical element $18_1$ shown in FIG. 12 the regions 106 and 108 are arranged alternately. By means of this arrangement the super grating is formed. The super grating of the diffractive optical element $18_1$ is therefore in the form of an amplitude super grating with a grating period d.

Furthermore, the diffractive optical elements $18_2$ and $18_3$ according to FIGS. 13 and 14 have stripe-shaped regions 110 or sub-apertures with modified diffraction structures of the first type. These diffraction structures are modified in relation to the diffraction structures of the first type contained in the region 106 such that a wave produced upon passing through the region 110 has a phase shifted by $\pi/2$ in relation to a wave produced upon passing through the region 106. The regions 106 and 110 are respectively disposed adjacent to one another and form so-called collective regions 111 with diffraction structures of the first type. The diffractive optical elements $18_2$ and $18_3$ differ in the sequence of the arrangement of the regions 106 and 110. The respective super grating of the diffractive optical elements $18_2$ and $18_3$ is formed by the alternating arrangement of the regions 118 and the respective collective regions 111. The super gratings of the diffractive optical elements $18_2$ and $18_3$ are respectively mixed forms of a phase super grating and an amplitude super grating.

FIGS. 15 and 16 illustrate the mode of the operation of the diffractive optical elements $18_1$, $18_2$ and $18_3$ in the apparatus 10 according to FIG. 1. During operation one of the respective diffractive optical elements $18_1$, $18_2$ and $18_3$ is disposed in the apparatus 10 such that the stripe-shaped regions 106, 108 and if applicable 110 of the diffractive optical elements $18_1$, $18_2$ and $18_3$ are disposed laterally to a connection line of the outlet surface 28 of the optical wave guide 26 and of an input aperture opening 128 with the aperture opening 36 of the outlet aperture 34.

The regions 106 of the diffractive optical elements $18_1$, $18_2$ and $18_3$ are designed to focus a wave 144 the light of which starts at right angles from the desired shape 112 of the effective reflection surface in the form of the surface 12 of the test object, onto a centre point 150 between the outlet surface 28 or the input aperture opening 128 and the aperture opening 36 of the outlet aperture 34. The desired shape 112 of the effective reflection surface according to FIGS. 15 and 16 has a curvature which is the contrary to the desired shape of the surface 12 according to FIG. 1. With the same desired shape, within the framework of the precision relevant for this, the wave 144 corresponds to the reflected measuring wave 44 illustrated in FIG. 1.

The wave 100 focussed onto the centre point 150 thus produced results from the zeroth diffraction order of the super grating. The super grating splits the wave 144 into several diffraction orders. The super grating period d is chosen here such that the wave 104 produced in the minus first diffraction order is focussed onto the outlet surface 28 of the optical wave guide 26 or onto the input aperture opening 128. The wave 102 produced in the plus first diffraction order is focussed onto the outlet aperture opening 36. Therefore the propagation direction of the wave 100 lies between the opposite propagation direction 50 of the input wave 30 and the propagation direction 48 of the outgoing measuring wave 46.

Since the optical path can be reversed, the input wave 30, which has its origin in the outlet surface 28 or the input aperture opening 128, also passes substantially at right angles onto the surface 12 of the test object 14. From here the reflected measuring wave 44 is reflected upon passing through the diffractive optical element $18_1$, $18_2$ or $18_3$ onto the output aperture opening 36. The reference wave 32 is produced in the zeroth diffraction order so that the super grating does not have any direct effect upon the shape of the reference wave 32.

The advantage of the embodiment of the diffractive optical element $18_2$ as a mixed form of a phase super grating and of an amplitude super grating shown in FIG. 13 is that the wave 100 in the zeroth diffraction order is suppressed in relation to the waves 102 and 104 in the plus or minus first diffraction order, and the efficiency of the first super grating order diffraction doubles. In the dual passage the intensity of the useful light is therefore increased by a factor of four.

Figure 17:
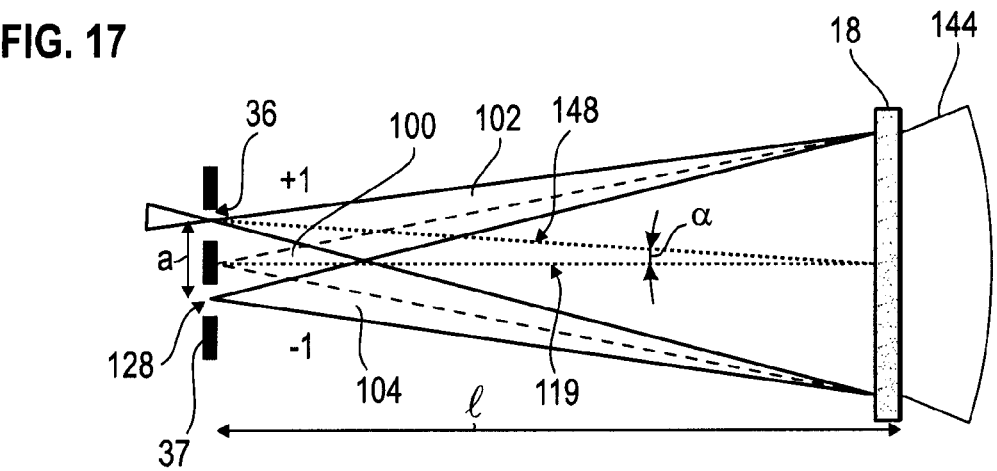

The arrangement of the regions 106, 108 and 110 in the diffractive optical element $18_3$ according to FIG. 14 has particular advantages regarding the suppression of disturbing reflexes. With reference to FIG. 17, in the following the super grating period d is evaluated by means of exemplary dimensioning of the apparatus 10.

If for the distance a between the input aperture opening 128 and the output aperture opening 36 a=30 mm, for the distance l between the in/outlet module 37 around the diffractive optical element 18 l=1 m and for the wave length $\lambda$=633 nm is applied, this produces a super grating period d of approximately 42 μm (super grating period d~2 $l\lambda/a$; tan $\alpha=a/(2\ l)$; sin $\alpha=\lambda/d$).

One essential advantage of the diffractive optical elements $18_1$, $18_2$ and $18_3$ with respect to a diffractive optical element which comprises a further encoded region for producing the tilted outgoing measuring wave 46 is the greater useful light yield. The useful light intensity for an exemplary thrice encoded optical element in the dual passage is produced, for example, as follows: $(1/3)^4 \times 0.42 \times 0.04 = 8 \times 10^{-5}$. The useful light intensity in the dual passage for the diffractive optical element $18_1$ according to FIG. 12, which is only encoded twice, is however produced as follows for the same conditions: $(2/3)^4 \times 0.42 \times 0.04 = 1.3 \times 10^{-3}$. In comparison to sub-aperture encoding without a super grating fewer disturbing orders are incorporated with the use of the super grating according to the invention.

In the embodiments of the diffractive optical elements $18_1$, $18_2$ and $18_3$ described, the outgoing measuring wave 46 also deviates from a spherical wave in the output aperture opening 36 for an ideal test object. The focus which the useful grating of the region 106 produces is only optimal in the zeroth diffraction order of the super grating; in the higher diffraction orders the wave front is somewhat distorted. This error is overlaid with the error of the test object. For the arrangement according to FIG. 16 the light of the input wave 30 is thus not optimally reshaped into the incoming measuring wave 42, and the reflected measuring wave 44 (even with the ideal test object 14) is not optimally focussed onto the output aperture opening 36.

According to a first embodiment this problem is counteracted by deducting the error. Since with the lens-free interferometer the intensity and phase of the useful light are measured, it is possible to calculate the error in advance and to compensate for it in the measurement. In a further embodiment the reference wave 32 is adapted. The diffraction gratings of the region 108 are adapted so that the reflected reference wave 32 has the same error as the outgoing measuring wave 46. The interference as a comparison of the reference wave 32 and the outgoing measuring wave 46 on the CCD detector then no longer shows the error.

In a further embodiment the error is compensated both in the useful grating of the regions 106 and/or 110 and in the super grating. The symmetry of the design only allows odd and even focus errors. These are compensated according to the invention by means of corrections on the useful gratings and/or on the super grating.

Overall, from this type of corrected diffraction grating the input wave 30 passing out of a spot light source is converted into an almost perfect incoming measuring wave 42 (within the framework of the production precision of the diffraction grating), and the measuring wave 44 reflected by the surface 12 of the test object 14 is focussed almost perfectly onto the output aperture opening 36. This means that this method is a true zero test.

Figure 18:
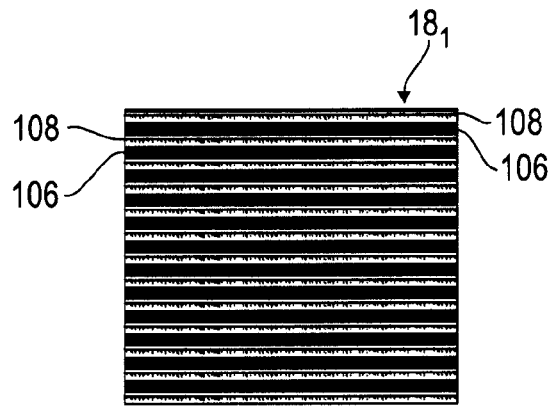
Figure 19:
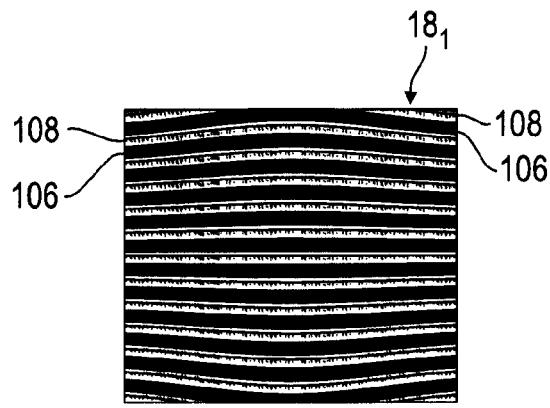

This type of optimised super grating is shown in FIG. 19. As in the comparison to the super grating shown in FIG. 18 which shows a larger section of the diffractive optical element 18₁ according to FIG. 12, the stripe-shaped regions 106 and 108 are bent upwards in an upper region of the super grating and bent downwards in a lower region of the super grating.

LIST OF REFERENCE NUMBERS 10 apparatus
12 surface
14 test object
16 illumination device
18 diffractive optical element
19 optical axis
20 recording device
22 radiation source
24 electromagnetic illumination radiation
26 optical wave guide
28 outlet surface
29 origin of the input wave
30 input wave
31 propagation axis of the input wave
32 reference wave
34 aperture
36 aperture opening
37 in/outlet module
38 CCD detector
40 centre point of the reference wave
42 incoming measuring wave
44 reflected measuring wave
46 outgoing measuring wave
48 propagation direction of the outgoing measuring wave
50 propagation direction of the input wave
52 centre point of the outgoing measuring wave
54 propagation direction of the incoming measuring wave
56 propagation direction of the reflected measuring wave
58 input section
60 branch
62 first output section
64 second output section
66 outlet surface
68 reflecting element
70 diffractive main structure
72 peripheral region
74a first diffractive adjustment structure
74b first diffractive adjustment structure
74c first diffractive adjustment structure
76 first part beam
78 focus point
80 reflecting spherical recess
82 second diffractive adjustment structure
84 second part beam
86 reflecting spherical recess
88 level reflecting region
90 first individual structure
92 second individual structure
94 transmission optics
96 reflecting element
98 optical path length
100 wave in the zeroth diffraction order
102 wave in the plus first diffraction order
104 wave in the minus first diffraction order
106 region with diffraction structures of a first type
108 region with diffraction structures of a second type
110 region with modified diffraction structures of the first type
111 collective region of the first type
119 propagation direction of the wave 100
128 input aperture opening
144 wave
148 propagation direction of the wave 102
150 centre point

The invention claimed is:

1. A method for interferometrically determining a deviation of an actual shape of an effective reflection surface of a test object from a desired shape of the effective reflection surface, comprising:

producing electromagnetic illumination radiation with an illumination device and providing the radiation as an input wave, passing the input wave through a diffractive optical element, to exit the element as an incoming measuring wave, the wave front of which is adapted to a desired shape of the effective reflection surface, disposing the test object in a test position in which the incoming measuring wave is reflected back to the diffractive optical element by the effective reflection surface of the test object as a reflected measuring wave, passing the reflected measuring wave through the diffractive optical element, to exit the diffractive optical element as an outgoing measuring wave, the propagation direction of the outgoing measuring wave being deviated upon exiting the diffractive optical element in relation to the opposite propagation direction of the input wave upon passing into the diffractive optical element, branching off a reference wave from the illumination radiation such that the reference wave interferes with the outgoing measuring wave, and recording an intensity distribution of an interference pattern produced by the interference of the reference wave with the outgoing measuring wave with a recording device.

2. The method according to claim 1,
wherein, upon passing through the diffractive optical element, the wave front of the input wave is transformed such that the wave front of the incoming measuring wave is adapted to the desired shape of the effective reflection surface.

3. The method according to claim 1,
wherein the wave front of the reflected measuring wave is transformed upon passing through the diffractive optical element.

4. The method according to claim 1,
wherein both the outgoing measuring wave and the reference wave respectively have a spherical surface-type wave front, and the center point of the wave front of the reference wave lies in the region of the center point of the wave front of the outgoing measuring wave.

5. The method according to claim 1,
wherein the propagation direction of the outgoing measuring wave and the opposite propagation direction of the input wave form an intermediate angle ($\alpha$) having dimensions such that the point of the wave front of the outgoing measuring wave is spaced apart from a propagation axis of the input wave such that the interference pattern is recorded by the recording device without disturbing the input wave.

6. The method according to claim 1,
wherein the propagation direction of the incoming measuring wave leaving the diffractive optical element is deviated in relation to the propagation direction of the input wave reaching the diffractive optical element.

7. The method according to claim 1,
wherein the propagation direction of the outgoing measuring wave leaving the diffractive optical element is deviated in relation to the propagation direction of the reflected measuring wave reaching the diffractive optical element.

8. The method according to claim 1,
wherein the optical path of the radiation of the input wave passing through the diffractive optical element differs from the optical path of the radiation of the reflected measuring wave passing through the diffractive optical element.

9. The method according to claim 1,
with which the diffractive optical element has a holographic optical element.

10. The method according to claim 9, wherein the holographic optical element is a computer generated hologram.

11. The method according to claim 1,
wherein the reference wave is branched off from the input wave by the diffractive optical element.

12. The method according to claim 1,
wherein the illumination device comprises a radiation source for producing the illumination radiation and an optical wave guide attached to the radiation source, and the optical wave guide has an outlet surface from which the illumination radiation exits as the input wave with a spherical surface-type wave front.

13. The method according to claim 12,
wherein the optical wave guide has an input section and two output sections, wherein the input section is connected to the output sections by a branch, and wherein, with one of the output sections, the radiation of the reference wave is branched off from the illumination radiation and is guided into the region of the center point of the wave front of the outgoing measuring wave.

14. The method according to claim 1,
wherein the illumination device and the recording device are connected to one another by an in/outlet module which has an outlet region of the input wave from the illumination device and an inlet region for the outgoing measuring wave into the recording device, and wherein the diffractive optical element comprises a diffractive adjustment structure for adjusting the relative position between the diffractive optical element and the in/outlet module.

15. The method according to claim 14,
wherein the diffractive optical element is first disposed relative to the in/outlet module in an approximation position, a second part-ray of the input wave is reflected by the diffractive adjustment structure onto a reflecting region of the in/outlet module, is reflected back onto the diffractive adjustment structure by the reflecting region of the in/outlet module, is then reflected onto the inlet region of the in/outlet module and is overlaid with the reference wave to produce an adjustment interference pattern, the intensity distribution of the adjustment interference pattern is recorded by the recording device, a deviation of the approximation position of the diffractive optical element from a measuring position is established by the recorded intensity distribution, and thereupon the relative position between the diffractive optical element and the in/outlet module is correspondingly corrected.

16. The method according to claim 1,
wherein the diffractive optical element has diffraction gratings which are arranged such that the diffraction gratings form a super grating.

17. The method according to claim 16,
wherein the period of the super grating is configured such that the wave produced in a diffraction order of the super grating when the reflected measuring wave passes through the diffractive optical element has the optical path of the opposite input wave, and the wave produced in another diffraction order of the super grating when the reflected measuring wave passes through the diffractive optical element has the optical path of the outgoing measuring wave.

18. The method according to claim 16,
wherein the period of the super grating is configured such that the waves produced when the reflected measuring wave passes through the diffractive optical element in the minus nth and plus nth diffraction order of the super grating have the opposite propagation direction of the input wave and the propagation direction of the outgoing measuring wave, respectively.

19. The method according to claim 18,
wherein at least one of the configuration of the individual diffraction gratings and the configuration of the super grating is designed such that focus errors of the waves produced in the minus nth and the plus nth first diffraction order of the super grating are compensated.

20. The method according to claim 16,
wherein the diffraction gratings have diffraction structures of a first type and wherein the diffractive optical element has diffraction structures of a second type which are configured to branch off the reference wave from the input wave by part of the input wave being reflected by the diffraction structures of the second type.

21. The method according to claim 20, wherein the super grating is formed by an alternating arrangement of regions with the diffraction structures of the first type and regions with the diffraction structures of the second type.

22. An apparatus for interferometrically determining a deviation of an actual shape of an effective reflection surface of a test object from a desired shape of the effective reflection surface, with
- an illumination device configured to produce electromagnetic illumination radiation as an input wave,
- a diffractive optical element disposed in the optical path of the input wave and is configured to provide the input wave as an incoming measuring wave, the wave front of which is adapted to a desired shape of the effective reflection surface, and the diffractive optical element further configured to guide the incoming measuring wave onto the effective reflection surface of the test object disposed in a test position so that the measuring wave is reflected back to the diffractive optical element by the effective reflection surface as a reflected measuring wave, and the diffractive optical element is further configured to provide the reflected measuring wave and to provide it as an outgoing measuring wave,
- a branch element configured to branch off a reference wave from the illumination radiation such that the reference wave interferes with the outgoing measuring wave, and
- a recording device configured to record an intensity distribution of an interference pattern produced by interference of the reference wave with the outgoing measuring wave, wherein the propagation direction of the outgoing measuring wave is deviated upon exiting the diffractive optical element in relation to the opposite propagation direction of the input wave upon entering the diffractive optical element.

23. A system comprisinq an apparatus according to claim 22 and a test object having an effective reflection surface to be measured, the test object being provided with a reflecting recess adjusting the test object relative to the apparatus.

24. A diffractive optical element for an apparatus for interferometrically determining a deviation of an actual shape of an effective reflection surface of a test object from a desired shape of the effective reflection surface, the diffractive optical element being configured to pass through an input wave as an incoming measuring wave, the wave front of which is adapted to a desired shape of the effective reflection surface, to provide the incoming measuring wave to the effective reflection surface of the test object disposed in a test position, so that the measuring wave is reflected back to the diffractive optical element by the effective reflection surface as a reflected measuring wave, to pass through the reflected measuring wave as an outgoing measuring wave, and the diffractive optical element having diffraction gratings arranged to form a super grating, the diffraction gratings being configured such that a wave is produced from the reflected measuring wave upon passing through the diffractive optical element in the zeroth diffraction order of the super grating, the propagation direction of which lies between the opposite propagation direction of the input wave and the propagation direction of the outgoing measuring wave.

* * * * *

UNITED STATES PATENT AND TRADEMARK OFFICE
CERTIFICATE OF CORRECTION

PATENT NO. : 7,791,737 B2
APPLICATION NO. : 11/939382
DATED : September 7, 2010
INVENTOR(S) : Bernd Doerband and Matthias Dreher It is certified that error appears in the above-identified patent and that said Letters Patent is hereby corrected as shown below:

In the Specification

Column 22, Line 58: Delete "$(1/3)^4 \times 0.42 \times 0.04 = 8 \times 10^{-5}$." and insert -- $(1/3)^4 \times 0.4^2 \times 0.04 = 8 \times 10^{-5}$. --

Column 22, Line 62: Delete "$(2/3)^4 \times 0.42 \times 0.04 = 1.3 \times 10^{-3}$." and insert -- $(2/3)^4 \times 0.4^2 \times 0.04 = 1.3 \times 10^{-3}$. --

In the Claims

Column 27, Line 18: In Claim 22, after "element" insert -- is --

Column 27, Line 25-26: In Claim 22, after "wave" delete "and to provide it"

Column 28, Line 6: In Claim 22, delete "comprisinq" and insert -- comprising --

Signed and Sealed this
Thirteenth Day of August, 2013

Teresa Stanek Rea
*Acting Director of the United States Patent and Trademark Office*